United States Patent [19]

Link et al.

[11] Patent Number: 5,572,427
[45] Date of Patent: Nov. 5, 1996

[54] DOPPLER POSITION BEARING ANGLE LOCATOR

[75] Inventors: John T. Link, Fort Wayne, Ind.; Gene D. Robertson, Bonita Springs, Fla.

[73] Assignee: Magnavox Electronic Systems Company, Fort Wayne, Ind.

[21] Appl. No.: 194,599

[22] Filed: Feb. 10, 1994

[51] Int. Cl.$^6$ .................................................. G01S 3/52
[52] U.S. Cl. .......................... 364/443; 364/451; 364/456; 342/418; 342/436; 342/401
[58] Field of Search .................. 364/443, 424.06, 364/459, 449, 439, 484; 340/993, 952, 967; 342/405, 402, 418, 450, 451, 457, 442, 449, 357, 359, 386; 367/123, 904, 101

[56] References Cited

U.S. PATENT DOCUMENTS

| | | | |
|---|---|---|---|
| 2,717,735 | 9/1955 | Luck | 235/92 |
| 3,290,685 | 12/1966 | Steiner | 343/106 |
| 3,866,227 | 2/1975 | Ruvin | 342/405 |
| 3,946,385 | 3/1976 | Ewen | 342/386 |
| 3,991,418 | 11/1976 | Bennett | 342/418 |
| 4,069,412 | 1/1978 | Foster et al. | 364/448 |
| 4,106,023 | 8/1978 | Baghdady | 342/405 |
| 4,301,455 | 11/1981 | Yetter | 342/398 |
| 4,350,984 | 9/1982 | Fisher | 342/451 |
| 4,417,250 | 11/1983 | Grousseau | 342/405 |
| 4,447,814 | 5/1984 | Treise | 342/401 |
| 4,551,727 | 11/1985 | Cunningham | 342/418 |
| 4,814,994 | 3/1989 | Doane et al. | 364/460 |
| 4,942,404 | 7/1990 | Kefer | 342/418 |
| 4,954,835 | 9/1990 | Lanciaux | 342/418 |
| 4,992,797 | 2/1991 | Gjessing et al. | 342/192 |

*Primary Examiner*—Kevin J. Teska
*Assistant Examiner*—Tan Nguyen
*Attorney, Agent, or Firm*—Roger M. Rickert; Richard T. Seeger

[57] ABSTRACT

A Doppler position locator for determining the bearing of a signal source from a moving receiver. The signal source encodes a digital signal indicating its actual transmitting frequency on a transmitted carrier. The moving receiver such as an airplane receives a Doppler shifted carrier frequency and the digital information on what the actual transmitted frequency was. Comparison of the received frequency to the digital information on the transmitted frequency yields a Doppler frequency (the increase or decrease caused by the relative motion, i.e., the numerical difference between the transmitted and received frequencies). From the aircraft velocity and the two frequencies, the bearing can be determined using the formula $\Theta=\cos^{-1}(d*c)/(f*v)$ where $\Theta$ is the bearing angle, f is the transmitted frequency, d is the Doppler shift or change in frequency, c is the speed of light and v is the magnitude of the receiver velocity. The airplane ground speed is determined independently by conventional navigation techniques.

9 Claims, 3 Drawing Sheets

DOPPLER POSITION BEARING ANGLE LOCATOR

SUMMARY OF THE INVENTION

The present invention relates generally to a method and apparatus for determining the location of a radio frequency source relative to a moving receiver by measuring the Doppler shift of the frequency of that source induced by motion of the receiver.

The Doppler effect (or shift) where a change in the observed frequency of a propagated wave occurs due to a change in distance between the observer and the source of the wave is well known. The classic example is where an approaching train whistle sounds higher in pitch to a stationary observer than it does to the engineer on the train, whereas, as the train recedes from the observer, the whistle sounds lower to the observer than it does to the engineer.

The Doppler effect has been used for navigational purposes, for example, in the so-called Doppler VOR. In this application, the Doppler shift is created by electronically rotating an antenna array so that the apparent signal source is sinusoidally approaching and retreating from the aircraft. The system does not rely on aircraft motion. Its purpose here is primarily to improve stability and accuracy over conventional VOR under adverse terrain conditions.

It is also known, for example, in U.S. Pat. 3,906,204, to employ Doppler shift techniques on satellite transmitted signals for determining the location of a vessel on the earth's surface. In this patented arrangement, data describing the satellite's orbit is transmitted to the vessel and the Doppler shift in the signal so sent is determined on the vessel by comparison of the received frequency with a locally generated reference signal. This system is subject to error according to how much variation there is between the actual transmitted frequency and the locally generated replica frequency.

Among the several objects of the present invention may be noted the provision of a technique for locating a radio frequency emitter on the earth's surface by measuring the Doppler shift on the radio frequency carrier as measured on a moving platform with a known track; the provision of a system using the Doppler phenomenon for determining the angle (bearing) of a stationary transmitter from a moving receiver, for example, on a moving airplane; and the provision of a relatively economical implementation of a bearing angle determination for moving receiver applications. These as well as other objects and advantageous features of the present invention will be in part apparent and in part pointed out hereinafter.

In general, a method of determining the bearing of a radio frequency source from a moving craft includes transmitting a radio frequency signal of a predetermined frequency from the source along with a Doppler effect independent indication of that predetermined frequency. Both the transmitted radio frequency signal and the Doppler effect independent indication of the predetermined frequency are received on the moving craft and are compared to determine the Doppler shift induced in the received radio frequency signal due to motion of the craft. The Doppler shift is then utilized in a computation involving the determined Doppler shift, the predetermined frequency, and the magnitude of the velocity of the moving craft to determine the bearing of the radio frequency source from the moving craft.

Also in General and in one form of the invention, an improved method for determining the bearing from a moving location to a data collection location is advantageously utilized in apparatus for collecting data at a location and relaying that data to a remote moving location by transmission on a radio frequency carrier signal. According to the improved method, the transmitted radio frequency is determined at the moving location as is the apparent frequency of the transmitted radio frequency signal. The difference between the transmitted and apparent frequencies is determined and that difference is utilized to compute the bearing of the data collection location from the moving location. The transmitted radio frequency may be determined by measuring the frequency at the data collection location, multiplexing the frequency measurement with the data to be transmitted, modulating the transmitted radio frequency signal with the multiplexed frequency measurement and data, demodulating the signal at the moving location, and demultiplexing the data and the frequency measurement to determine the frequency measurement.

Still further in General, in the environment of an apparatus for collecting data at a location and relaying that data to a remote moving location by transmission on a radio frequency carrier signal, an improved method for determining the bearing from the moving location to the data collection location includes providing a digital indication of the frequency of the radio frequency carrier signal and utilizing that indication long with the data to modulate the transmitted radio frequency carrier signal. At the moving location, the digital indication is utilized to compute the bearing of the data collection location from the moving location. Typically, the utilization process includes determining the transmitted radio frequency as well as the difference between the digital indication and the apparent frequency. The bearing angle may be calculated from $$\Theta = \cos^{-1}(d*c)/(f*v),$$

where $\Theta$ is the bearing angle, f is the transmitted frequency, d is the difference between the apparent transmitted frequency and the digital indication, i.e., d is the Doppler shift, c is the speed of light and v is the magnitude of the velocity of the moving location.

BRIEF DESCRIPTION OF THE DRAWING

Corresponding reference characters indicate corresponding parts throughout the several views of the drawing.

The exemplifications set out herein illustrate a preferred embodiment of the invention in one form thereof and such exemplifications are not to be construed as limiting the scope of the disclosure or the scope of the invention in any manner.

DESCRIPTION OF THE PREFERRED EMBODIMENT

Figure 1:
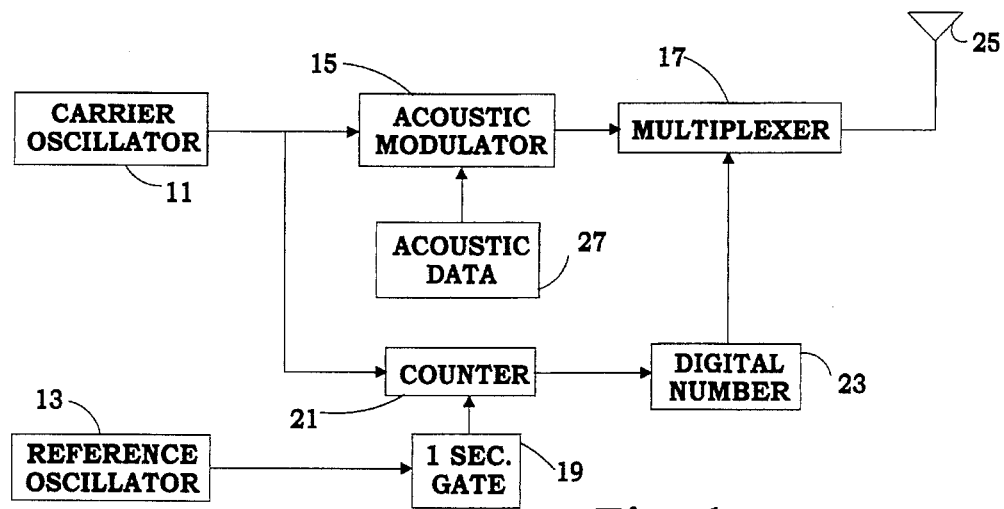
FIG. 1 is a schematic diagram of a radio transmitter particularly adapted to the practice of the present invention.

For illustrative purposes, the transmitter of FIG. 1 is located on a sonobuoy and is transmitting received acoustic data to a remote location. In FIG. 1, a conventional radio frequency signal is generated by the oscillator 11 and that carrier is modulated at 15 with data such as acoustic data 27 being accumulated by a sonobuoy. A reference oscillator 13 and associated Gate 19 are together effective to enable the counter 21 for a precise time interval such as one second. Thus, the counter 21 provides a digital representation of the frequency of the carrier oscillator 11 to the register 23. That digital representation in register 23 may be periodically updated as desired. The digital representation of the oscillator frequency is multiplexed with the modulated radio frequency signal at 17 and the composite signal is transmitted by antenna 25.

Figure 2:
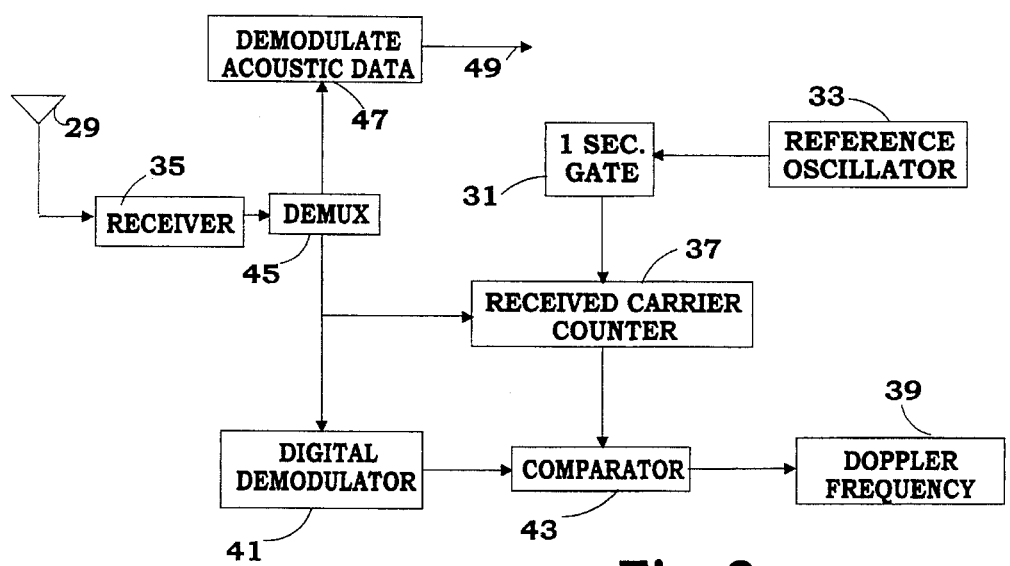
FIG. 2 is a schematic diagram of a radio receiver suitable for use in conjunction with the transmitter of FIG. 1.

The receiver 35 of FIG. 2 is, for example, located on a moving airplane and is receiving the signal from the sonobuoy antenna 25 on an airborne antenna 29. The received signal is demultiplexed at 45 with the digital indication of the frequency of oscillator 11 being stripped off and supplied to a comparator 43 by demodulator 41. Reference oscillator 33 and the associated gate 31 enable the counter 37 for a precise time interval such as one second. Thus the received carrier signal is sampled for a one second interval to get a digital representation of the received frequency in counter 37. The received frequency, and thus count, is Doppler shifted and differs from the digital count provided by the demodulator 41. The difference is determined in comparator 43 and the actual amount of Doppler shift is stored in register 39.

Figure 3:
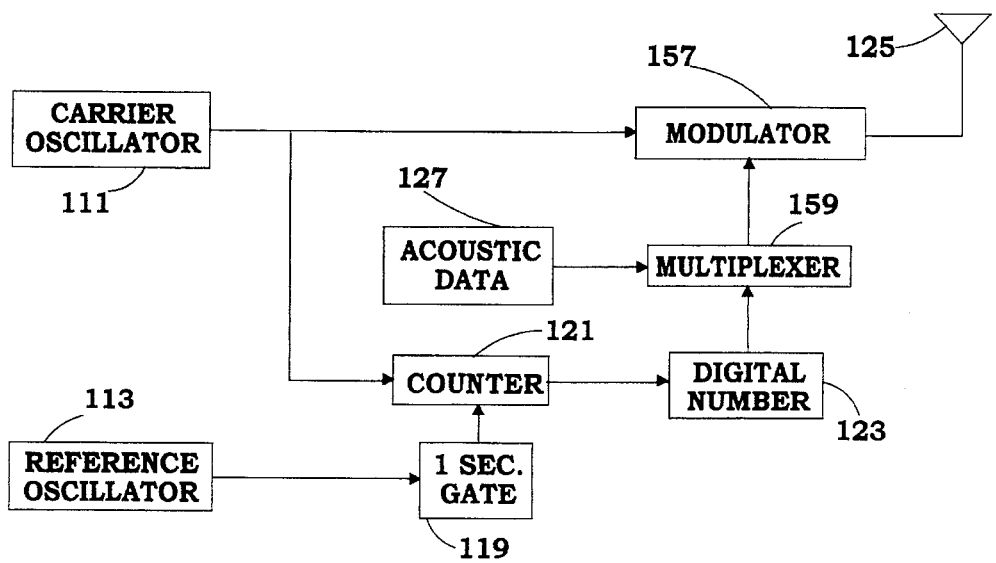
FIG. 3 is a schematic diagram of a radio transmitter illustrating one variation in the practice of the present invention.
Figure 4:
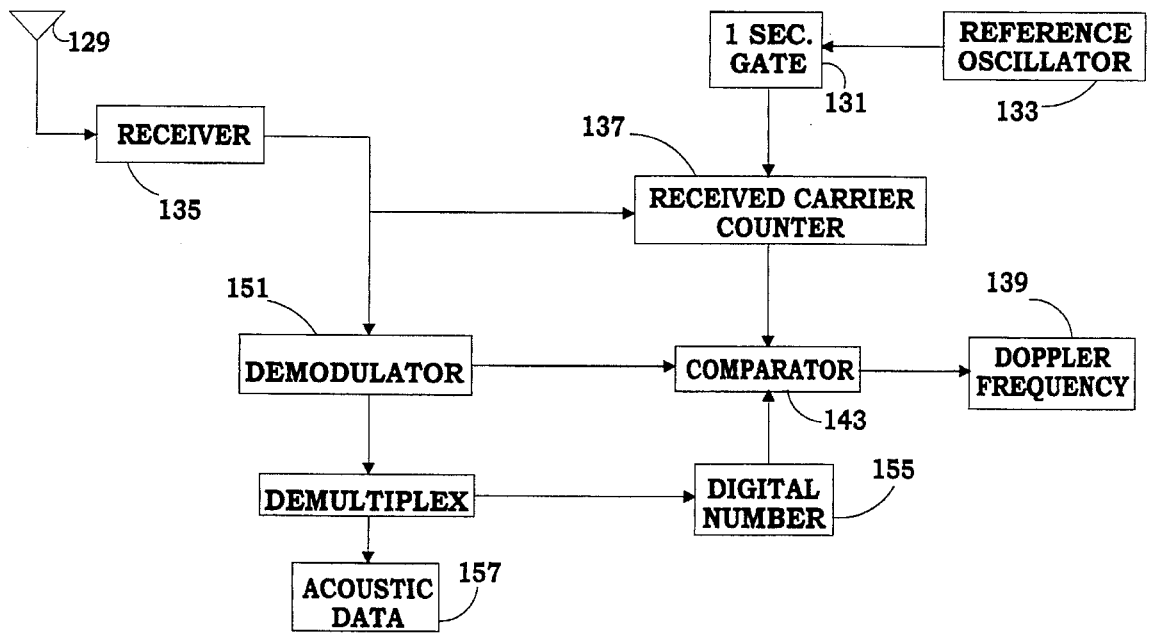
FIG. 4 is a schematic diagram of a radio receiver suitable for use in conjunction with the transmitter of FIG. 3.

Components numbered in FIGS. 1 and 2 having counterparts in FIGS. 3 and 4 which perform substantially the same function are numbered similarly in FIG. 3 and 4 but with reference numbers 100 more than their counterparts in FIGS. 1 and 2. It will be recognized that the precise configuration of the transmitter and receiver will depend on the type of modulation employed, e.g., AM, FM, phase, single-sideband and the like. The transmitter of FIG. 3 may, as before, be located on a sonobuoy. A digital representation of the frequency of carrier oscillator 11 is determined and stored in register 123 as before. The acoustic data from 127 and this digital indication are time division multiplexed at 159. The time division multiplexed signal is used to modulate the carrier at 157 and the thus modulated carrier is transmitted by antenna 125.

Airborne receiver 135 receives this modulated carrier on its antenna 129 and supplies that signal to demodulator 151. The modulated signal is also supplied to counter 137 for, as before, a one second interval to obtain an indication of the received (Doppler shifted) frequency. The acoustic and digital information is demultiplexed at 153 to supply an acoustic output 157 and an indication of the digital number (from 123 in FIG. 3) to register 155. The digital number and receiver carrier count are compared at 143 and the Doppler frequency shift is stored at 139 for future use.

Figure 6:
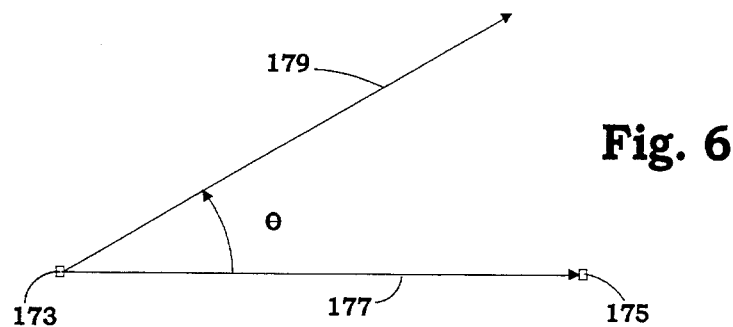
FIG. 6 is a vector illustration of the relationship of the source and receiver.

In FIG. 6, the aircraft or other moving platform is located at 173 and its velocity (v) is indicated by the vector 179. The bearing ($\ominus$) from the airplane to the source (sonobuoy or other source) 175 is shown by the vector 177. The bearing angle $\ominus$ may be computed from $$\ominus = \cos^{-1}(d*c)/(f*v) = \cos^{-1}(d/f)*(1/v)*c.$$

where f is the transmitted frequency, d is the Doppler shift or change in frequency, c is the speed of light and v is the magnitude of the aircraft velocity. While numerous forms are possible for this computation, it is the second equation above which is implemented in FIG. 5. It will be recognized that there is a 180 degree ambiguity in the arc cos computation, but this may be readily resolved if the general direction of the source is known or by utilizing any of several other known techniques.

Figure 5:
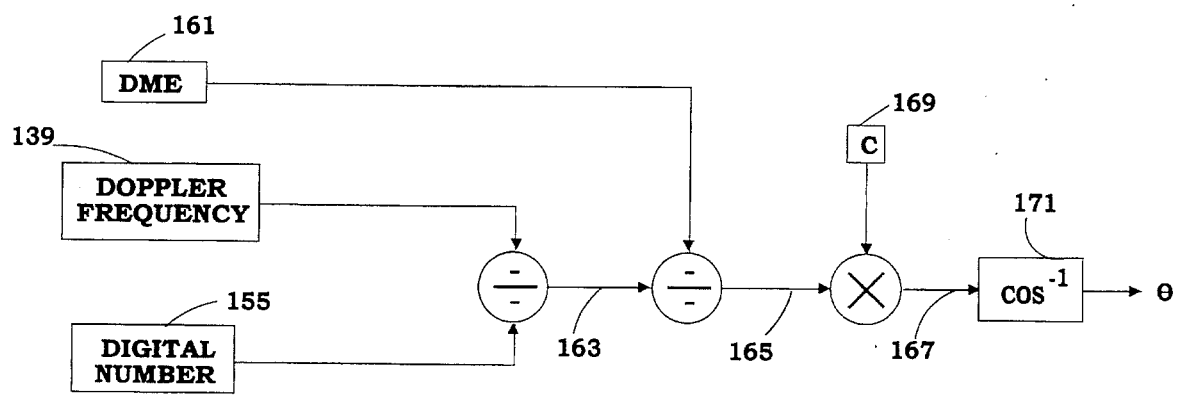
FIG. 5 is a schematic diagram of apparatus for computing the bearing of the source or transmitter of FIGS. 1 or 3 from the receiver of FIGS. 2 or 4 respectively.

In FIG. 5, the Doppler frequency (shift) from 139 in FIG. 4 or 39 in FIG. 2 is divided by the transmitted frequency as indicated by the received digital number at 155 in FIG. 4 or as provided by the demodulator 41 in FIG. 2 with this quotient appearing on line 163. The aircraft or other moving platform has on board some arrangement for determining the aircraft location. This can be any of numerous techniques such as a satellite positioning apparatus, an on-board navigational computer, conventional distance measuring equipment (DME) or other navigational apparatus. The velocity of the moving platform is somehow determined as illustrated by the DME 161 in FIG. 5 and this velocity is divided into the quotient appearing on line 163 providing a second quotient on line 165. The second quotient is multiplied by the speed of light 169 (a constant) and the result is presented on line 167 to an arc cos computation or table look-up 171. The resulting output is the bearing angle theta $\ominus$ of FIG. 6 from the plane to the source.

From the foregoing, it is now apparent that a novel Doppler effect locating technique has been disclosed meeting the objects and advantageous features set out hereinbefore as well as others, and that numerous modifications as to the precise shapes, configurations and details may be made by those having ordinary skill in the art without departing from the spirit of the invention or the scope thereof as set out by the claims which follow.

What is claimed is:

1. A method of determining a bearing of a radio frequency source from a moving craft comprising the steps of:

transmitting a radio frequency signal of a predetermined frequency from the source;

transmitting a Doppler effect independent indication of the predetermined frequency from the source;

receiving both the transmitted radio frequency signal and the Doppler effect independent indication of the predetermined frequency on the moving craft;

comparing the frequency of the received radio frequency signal with the Doppler effect independent indication of the predetermined frequency of that signal to determine the Doppler shift induced in the received radio frequency signal due to motion of the craft; and utilizing the determined Doppler shift to compute the bearing of the radio frequency source from the moving craft.

2. The method of claim 1 wherein the step of utilizing comprises a computation involving the determined Doppler shift, the predetermined frequency, and the velocity of the moving craft.

3. The method of claim 2 wherein the computation is given by $$\ominus = \cos^{-1}(d*c)/(f*v),$$

where $\ominus$ is the bearing angle, f is the transmitted frequency, d is the Doppler shift, c is the speed of light and v is the magnitude of the velocity of the moving craft.

4. In apparatus for collecting data at a location and relaying that data to a remote moving location by transmission on a radio frequency carrier signal, an improved method for determining a bearing from the moving location to the data collection location comprising:

transmitting from said location a radio frequency signal;

receiving at the remote moving location the transmitted radio frequency signal;

determining, at the remote moving location, the frequency of the transmitted radio frequency signal;

determining the difference between the frequency of the transmitted radio frequency signal and the frequency of the received radio frequency signal; and utilizing the determined difference to compute the bearing of the data collection location from the moving location.

5. The method of claim 4 wherein the frequency of the transmitted radio frequency signal is determined by measuring that frequency at the data collection location, multiplexing the frequency measurement with the data to be transmitted, modulating the transmitted radio frequency signal with the multiplexed frequency measurement and data, demodulating the received radio frequency signal at the moving location, and demultiplexing the data and the frequency measurement to determine the frequency measurement.

6. The method of claim 4 wherein the step of utilizing includes computing $$\Theta = \cos^{-1}(d*c)/(f*v),$$

where $\Theta$ is the bearing angle, f is the frequency of the transmitted radio frequency signal, d is the difference between the frequency of the transmitted radio frequency signal and the frequency of the received radio frequency signal, c is the speed of light and v is the magnitude of the velocity of the moving location.

7. In apparatus for collecting data at a location and relaying that data to a remote moving location by transmission on a radio frequency carrier signal, an improved method for determining a bearing from the moving location to the data collection location comprising:

generating a digital indication of the frequency of the radio frequency carrier signal;

generating a radio frequency signal; modulating the generated radio frequency signal with both the provided digital indication and collected data;

transmitting the modulated radio frequency signal; and utilizing, at the moving location, the digital indication in computing the bearing of the data collection location from the moving location.

8. The method of claim 7 wherein the step of utilizing the digital indication includes:

determining, at the moving location, the transmitted radio frequency; and determining the difference between the digital indication and the determined transmitted radio frequency.

9. The method of claim 8 wherein the step of utilizing includes computing $$\Theta = \cos^{-1}(d*c)/(f*v),$$

where $\Theta$ is the bearing angle, f is the transmitted frequency, d is the difference between the transmitted frequency and the determined transmitted radio frequency, c is the speed of light and v is the magnitude of the velocity of the moving location.

* * * * *